US007003438B1

(12) United States Patent
Dowd et al.

(10) Patent No.: US 7,003,438 B1
(45) Date of Patent: Feb. 21, 2006

(54) APPARATUS FOR CORRECTING FOR THE EFFECTS OF LASER NOISE

(75) Inventors: Andrew Vernon Dowd, Weston, MA (US); Martin W. Levine, Manchester-by-the-Sea, MA (US)

(73) Assignee: Kernco, Inc., Danvers, MA (US)

( * ) Notice: Subject to any disclaimer, the term of this patent is extended or adjusted under 35 U.S.C. 154(b) by 62 days.

(21) Appl. No.: 10/640,139

(22) Filed: Aug. 13, 2003

Related U.S. Application Data

(60) Provisional application No. 60/443,317, filed on Jan. 29, 2003.

(51) Int. Cl.
H04B 15/00 (2006.01)
(52) U.S. Cl. ...................................... 702/191; 702/195
(58) Field of Classification Search ................ 702/191, 702/189, 190, 193–195; 372/38.08, 38.01, 372/29.011
See application file for complete search history.

(56) References Cited

U.S. PATENT DOCUMENTS

| | | | | |
|---|---|---|---|---|
| 5,442,648 | A * | 8/1995 | DuBose et al. | 372/38.08 |
| 5,524,015 | A * | 6/1996 | Holsinger et al. | 372/38.08 |
| 5,652,715 | A * | 7/1997 | Hanson | 702/191 |
| 5,721,514 | A * | 2/1998 | Crockett et al. | 331/3 |
| 5,946,333 | A * | 8/1999 | Kappeler | 372/29.022 |
| 6,130,583 | A * | 10/2000 | Stern et al. | 331/3 |
| 6,172,570 | B1 * | 1/2001 | Deng | 331/3 |
| 6,201,821 | B1 * | 3/2001 | Zhu et al. | 372/32 |
| 6,255,647 | B1 * | 7/2001 | Vanier et al. | 250/251 |
| 6,265,945 | B1 | 7/2001 | Delaney et al. | |
| 6,300,841 | B1 * | 10/2001 | Atsumi et al. | 331/94.1 |
| 6,320,472 | B1 | 11/2001 | Vanier | |
| 6,760,716 | B1 * | 7/2004 | Ganesamoorthi et al. | 706/21 |
| 6,763,153 | B1 * | 7/2004 | Bennett | 385/12 |
| 6,831,522 | B1 * | 12/2004 | Kitching et al. | 331/3 |
| 6,895,094 | B1 * | 5/2005 | Scalart et al. | 381/66 |
| 2002/0167980 | A1 * | 11/2002 | Verboom et al. | 372/38.08 |
| 2003/0087618 | A1 * | 5/2003 | Li et al. | 455/214 |

OTHER PUBLICATIONS

Mileti et al., "Laser-Pumped Rubidium Frequency Standards: New Analysis and Progress", Feb. 1998, IEEE Journal of Quantum Electronics, vol. 34, No. 2, pp. 233-237.*

BEOC Laser Power Controller, www.brocktoneo.com/images/1pc__020301/pdf/ Jun. 10, 2003.

G. Mileti, J.Q. Deng, F.L. Walls, J.P. Lowe, R.E. Drullinger; "Recent Progress in Laser-Pumped Rubidium Gas-cell Frequency Standards", IEEE International Frequency Control Symposium, 1996.

\* cited by examiner

*Primary Examiner*—Marc S. Hoff
*Assistant Examiner*—Anthony Gutierrez
(74) *Attorney, Agent, or Firm*—Gordon E. Nelson

(57) ABSTRACT

Adaptive noise reduction techniques used in devices that pass light from a laser through a quantum medium such as a rubidium vapor cell. A CPT frequency standard that employs the techniques has a first channel in which the laser light passes through the quantum medium and to a photodetector to produce a first signal and a second channel in which the light passes to a second photodetector without passing through the quantum medium to produce a second signal. The first and second signals are processed in a signal processor to produce an enhanced output signal in which the noise has been reduced. The signal processor implements noise predictor and noise remover. In a preferred embodiment, the noise predictor employs a FIR filter in which the coefficients are set in response to feedback from the enhanced output signal.

6 Claims, 4 Drawing Sheets

FIR filter 401

LMS algorithm 409
N = order of filter

APPARATUS FOR CORRECTING FOR THE EFFECTS OF LASER NOISE

CROSS REFERENCES TO RELATED APPLICATIONS

The present patent application claims priority from U.S. Provisional Patent Application 60/443,317, Martin W. Levine and Andrew Dowd, A technique for enhancing performance of frequency standards using adaptive noise reduction, filed Jan. 29, 2003.

BACKGROUND OF THE INVENTION

1. Field of the Invention

The invention is concerned generally with correction of errors induced by noise in light produced by lasers and more specifically with correction of such errors in CPT frequency standards.

2. Description of Related Art: FIG. 1

Light produced by lasers has many applications. Among them are applications where how well the application works is directly related to the amount of noise in the output produced by the application. For present purposes, noise is defined as any irregularity which makes the application work less well than it would otherwise. In some cases it is possible to attack the noise problem directly by controlling the ultimate source of the noise. However, in other instances it is either impossible or impractical to sufficiently dampen the sources of noise generation. For example, one class of noise is produced by thermal effects, which can be reduced by cryogenic cooling, but doing that may render the resulting system impractical. In such cases, it is possible to correct for the noise and thereby mitigate its impact on the output produced by the instrument.

Noise can be either purely random, periodic or combinations of both. At any given moment of time, the magnitude of the noise component in a signal is either completely unknown or in most cases, predictable only in the statistical sense. Therefore for a given measurement it is impossible or difficult to differentiate the desired signal from the undesirable noise term. The measured signal contains a component that is noise combined with a component that is the desired waveform. To remove noise, we need a mechanism that can predict the noise that exists in a given measurement of the actual signal. If the noise can be predicted, the noise can be removed from the output signal. For example, in the case of simple additive noise, the noise prediction is subtracted from the corrupted signal. For any noise process that is mathematically reversible, noise prediction can be used to reduce or completely eliminate the noise from the output signal.

In applications involving laser light, two important kinds of noise are irregularities in the intensity of the laser light and irregularities in the frequency of the laser light. One application of laser light where the noise in the light is important is in coherent population trapping (CPT) atomic frequency standards, popularly known as "CPT atomic clocks". What these devices do is use the light emitted by the laser to produce a signal with an extremely regular form. That signal can in turn be used to precisely measure intervals of time. FIG. 1 shows at 101 a high-level block diagram of a CPT frequency standard 101. A laser light source 103 of the proper frequency provides a beam of light which passes through a rubidium vapor cell 105. The frequency of the laser light is modulated such that the beam of light causes the rubidium atoms in the vapor to resonate. The resonations in turn affect how much of the laser light is absorbed by rubidium vapor cell 105 and thus how much of the laser light reaches photodetector 107. The output from photodetector 107 of course varies with the amount of light that reaches it, and the form of the output thus reflects the resonance of the rubidium atoms. The output is then provided to signal processor 109 for further processing. For more details concerning CPT atomic frequency standards, see U.S. Pat. No. 6,320,472, Jacques Vanier, Atomic Frequency Standard, issued Nov. 20, 2001, which is incorporated in the present application by reference.

As is apparent from the foregoing description, the accuracy of the output produced by photodetector 107 is affected by noise in the laser light. If the intensity of the laser light varies, the intensity variations are passed through rubidium vapor cell 105; if the frequency of the laser light varies, that affects the resonance of the rubidium atoms, and that in turn affects how much laser light passes through rubidium vapor cell 105.

At 113 is shown a prior-art arrangement for compensating for noise in the laser light. There is added to the arrangement shown at 101 a beam splitter 117, a photo detector 115, a servo control unit 116, and a liquid crystal 117. The amount of light transmitted by the liquid crystal varies according to an input signal from servo control unit 116. Beam splitter 117 provides part of the light from laser light source 103 to photodetector 115 and the remainder to liquid crystal 116 and rubidium vapor cell 105. The output from photodetector 115 goes to servo control unit 116. The output from photodetector 115 varies with the intensity of the light from laser source 105, and the output is used in servo control unit 116 to control liquid crystal 119 such that the amount of light transmitted by liquid crystal 119 remains constant. Liquid crystal 119 thus compensates for variations in the intensity of laser light source 103.

A module which contains beam splitter 117, photodetector 115, servo control unit 116, and liquid crystal 119 is the LPC Laser Power Controller, made by Brockton Electro-Optics Corp., 34 Bellevue, Brockton, Mass. 2302. On Jun. 10, 2003, a description of the module could be downloaded from the Internet at brocktoneo.com/images/lpc_020301/pdf/.

While arrangement 113 does compensate for variations in the intensity of laser light source 103, it can compensate only for intensity noise; it cannot compensate for other noise such as variations in the frequency of the laser light source or noise resulting from photodetector 107; moreover, it is adaptive only with regard to laser light source 103, not with regard to other components of the system. Adaptivity is important in dealing with noise because the properties of an apparatus change as the conditions under which it operates change or as it ages, and the changes in the properties affect both how much noise must be dealt with and the manner in which the apparatus deals with it.

It is thus an object of the invention disclosed herein to provide improved techniques for dealing with the noise in laser light as well as other noise produced by components of the device.

SUMMARY OF THE INVENTION

The object of the invention is attained by apparatus that processes laser light and that has a first channel for the light in which the light is processed to produce an output signal having a noise component, a second channel for the light in which the light is processed to produce a noise signal, and a noise remover that receives the output signal and the noise signal and produces an enhanced output signal in which the noise component has been reduced.

In further aspects of the apparatus, the noise component includes noise resulting from amplitude variations in the light from the laser. Further, the second channel receives the enhanced output signal as an input and employs the enhanced output signal to produce the noise signal.

Additionally, the second channel includes a noise measurer that produces a noise measurement and a noise predictor that receives the noise measurement and produces the noise signal in response to the noise measurement. The noise measurer measures the amplitude variations of the laser light. The noise measurer may be a photodetector that receives the light from the laser and produces the noise measurement in response to the laser light. The noise predictor employs scaled and/or delayed noise measurements to produce the noise signal. The noise predictor may also receive the enhanced output signal and use the enhanced output signal to scale the noise measurements. In some embodiments, the noise predictor may be a FIR filter.

A CPT frequency standard that employs the invention includes a laser light source a laser light source, a resonator through which the laser light passes and which resonates in response to the laser light and thereby affects the amount of laser light that passes through the resonator, a first photodetector that receives the laser light that passes through the resonator and produces a signal in response to the received laser light, an output processor that responds to the signal from the photodetector to produce an output signal that includes at least noise resulting from amplitude changes in the laser light, a second photodetector that receives laser light that has not passed through the resonator and produces a noise measurement signal from that laser light, a noise predictor that produces a noise signal in response to the noise measurement signal, and a noise remover that responds to the noise signal and the output signal to produce an enhanced output signal in which the noise has been reduced.

The noise predictor further employs scaled and/or delayed noise measurements to produce the noise signal. The noise predictor may also receive the enhanced output signal and use the enhanced output signal to scale the noise measurements. In some embodiments, the noise predictor may be a FIR filter.

Other objects and advantages will be apparent to those skilled in the arts to which the invention pertains upon perusal of the following Detailed Description and drawing, wherein:

Figure 1:
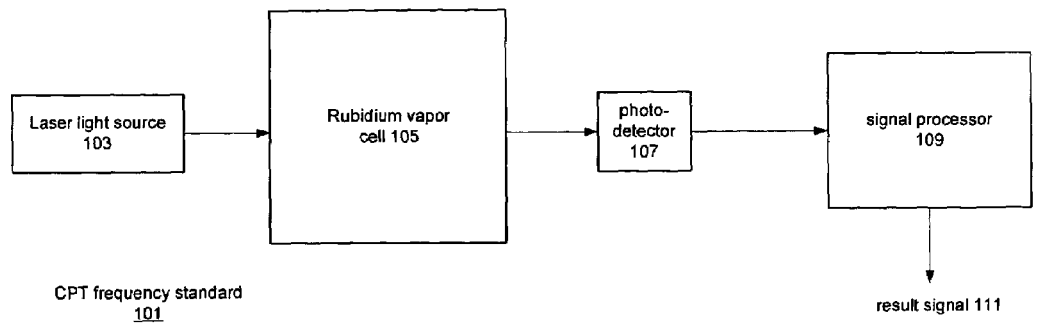
FIG. 1 is a block diagram of two prior-art CPT frequency standards.
Figure 1:
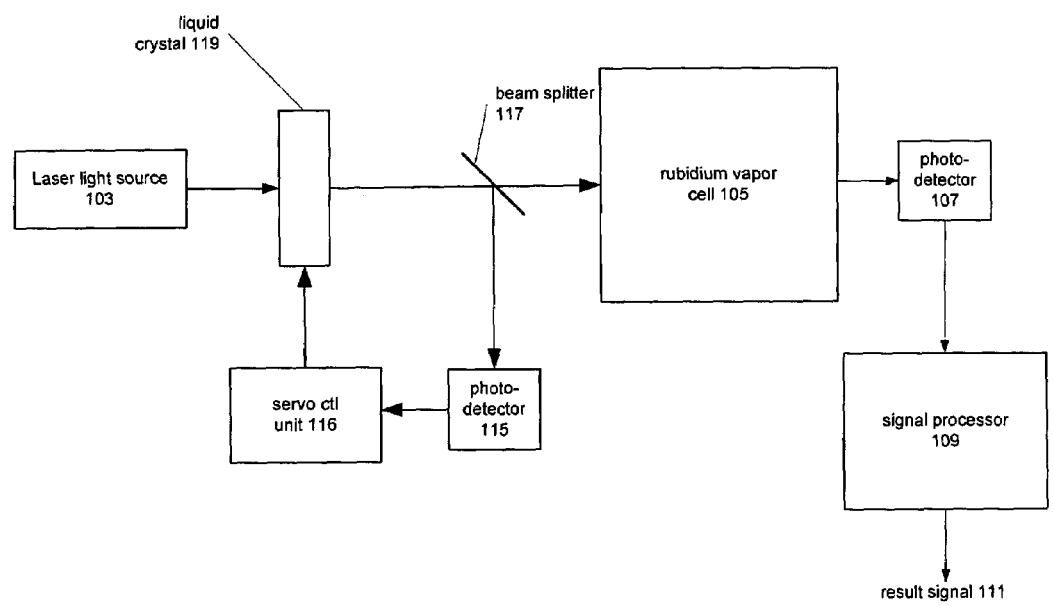

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first present a conceptual overview of the invention and will thereupon describe how the invention may be embodied in a CPT atomic frequency standard.

Figure 2:
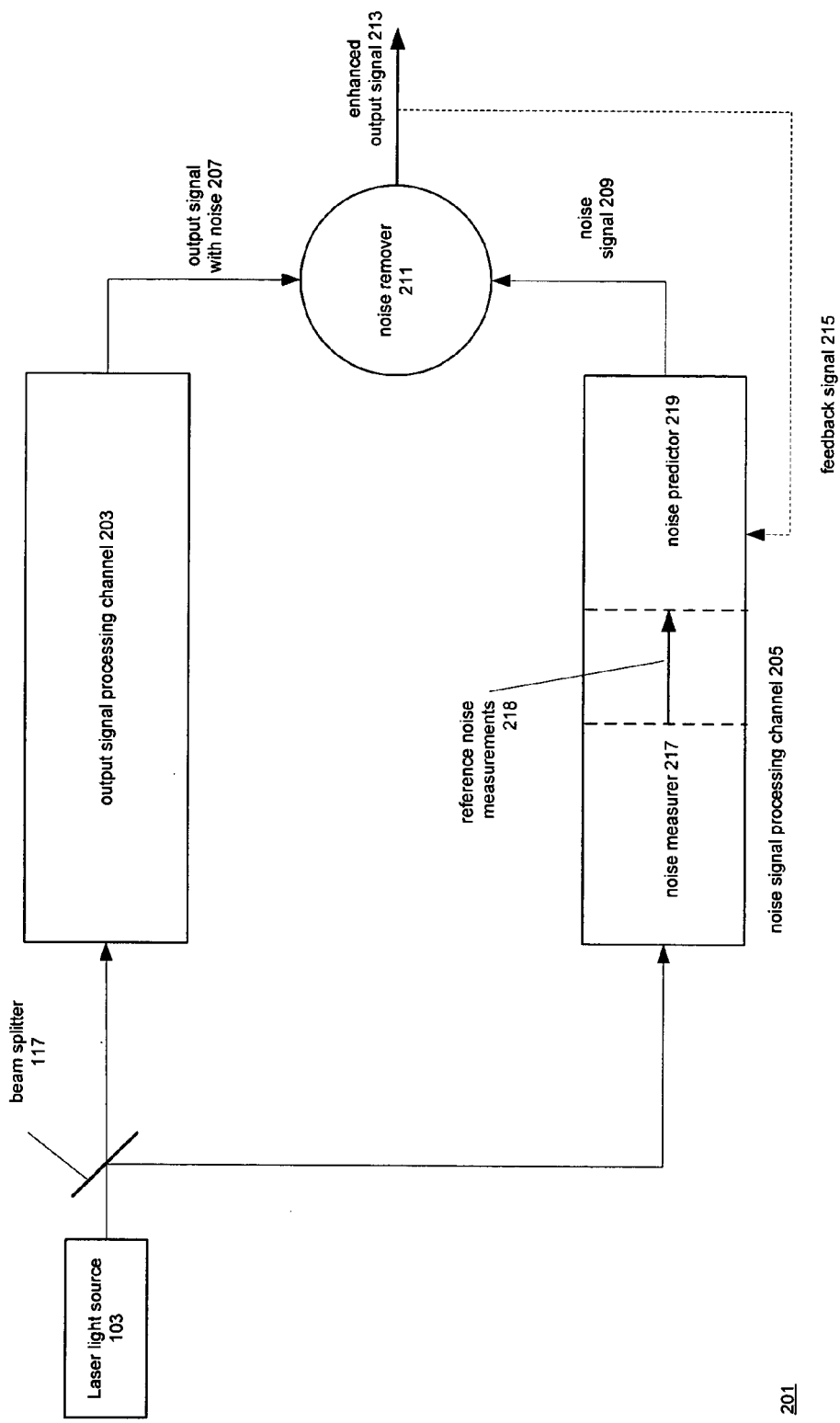
FIG. 2 is a block diagram of apparatus for correcting for the effects of laser noise.

Overview of the Invention: FIG. 2

An apparatus such as CPT frequency standard 101 which produces an output that is dependent on input from a laser light source can be regarded at the highest level as an output signal processing channel which receives input from the laser light source and produces an output signal that depends on the laser light source. In system 101, rubidium vapor cell 105, photodetector 107, and signal processor 111 are components of the output signal processing channel. Noise in result signal 111 may result not only from laser light source 103, but from any other component in the output signal processing channel.

System 201 of FIG. 2 contains such an output signal processing channel 203. Channel 203 receives light from laser light source 103 and produces an output signal 207. Output signal 207 is dependent on laser light source 103 and includes a noise component. The noise component may be the result of noise in the laser light or of noise from other components of output signal processing channel 203. Other components of the system include a beam splitter 117, a noise signal processing channel 205, and a noise remover 211. Noise signal processing channel 205 receives light from the laser via beam splitter 117 and produces a noise signal 209 that is at least dependent on noise in laser light source 103. Output signal with noise 207 and noise signal 209 are input to noise remover 211 which produces an enhanced output signal 213 in which the noise component of signal 207 has been reduced in response to noise signal 209. Enhanced output signal 213 may further be fed back to noise signal processing channel 205 for use in producing noise signal 209, as shown at 215.

The components of noise signal processing channel 205 must include at a minimum noise measurer 217. Noise measurer 217 provides an independent noise reference measurement 218 of the noise (or of a property from which the noise may be inferred) that is mostly free of the component of the laser light source from which channel 203 will produce the output. Noise predictor 219 then uses noise measurements 218 to predict the amount of noise that there will be in output signal 207 and produces noise signal 209 from that prediction. In some cases, noise measurement 218 may be used by itself to predict the noise. There are, however, important advantages to be gained when noise predictor 215 uses noise measurements 218 together with feedback signal 215 to produce noise signal 209. Feedback signal 215 can be used to make noise predictor 219 adaptive, that is, noise signal 209 will not only depend on noise measurements 218, but also on the current condition of output signal processing channel 203. Inputs to channel 205 may include more than one noise reference measurement as well as other noise information from components of output signal processing channel 203. Components of noise signal processing channel 205 and the manner in which noise signal 209 is produced will of course depend on the causes of the noise. There may further be more than one noise signal processing channel, with the noise signals from the different noise signal processing channels all being used to produce enhanced output signal 213.

Advantages of Adaptivity

Adaptivity is important because the noise in the system will vary as the condition of the system changes. Where no adaptive noise prediction technique is used, these variations in the amount and or kind of noise can reduce the effectiveness of noise reduction or, in the worst case, actually cause the noise reduction to result in increased noise levels. The adaptive approach uses reference measurement 218 of the noise signal and a feedback measurement 215 that is taken after noise reduction is applied. Noise predictor 219 applies a mathematical prediction algorithm to the noise reference measurements and feedback signal 214 to create a noise prediction, which is then used to make noise signal 209. In the algorithm, feedback signal 215 is used to adjust the noise prediction and hence improve the noise reduction. There are numerous algorithms that can be used in noise predictor 219. An example algorithm will be described below which minimizes the correlation between the noise measurement and feedback term, and thereby determines the noise component in signal 207. The details of the adaptive algorithm will vary depending on the nature of the noise.

Key Advantages of Adaptive Noise Prediction Include the Following:

Self-Tuning—The noise corruption can vary from device to device. Without an adaptive circuit each would require a tuning process during manufacturing to compensate for variations. Apparatus made as shown in FIG. 1 is self-tuning. The device will make the necessary adjustments during initial power-up.

Adjusts for environmental changes—Environmental conditions can cause the noise produced in the system to vary and shift. The adaptive approach will automatically adjust the noise reduction to compensate for these changes. Thus, the resulting instrument will be more tolerant of environmental shifts. This can greatly improve performance for portable implementations.

Adjusts for changes in the device—With time, all devices age and change characteristics. These aging affects can reduce the effectiveness of any noise reduction circuitry that is not adaptive. Conversely, the adaptive approach will automatically adjust for changes in delay, gain, etc that can accompany instrument aging. Since the adjustment is automatic, the need for device maintenance is reduced and the useful lifetime of the device extended.

Figure 3:
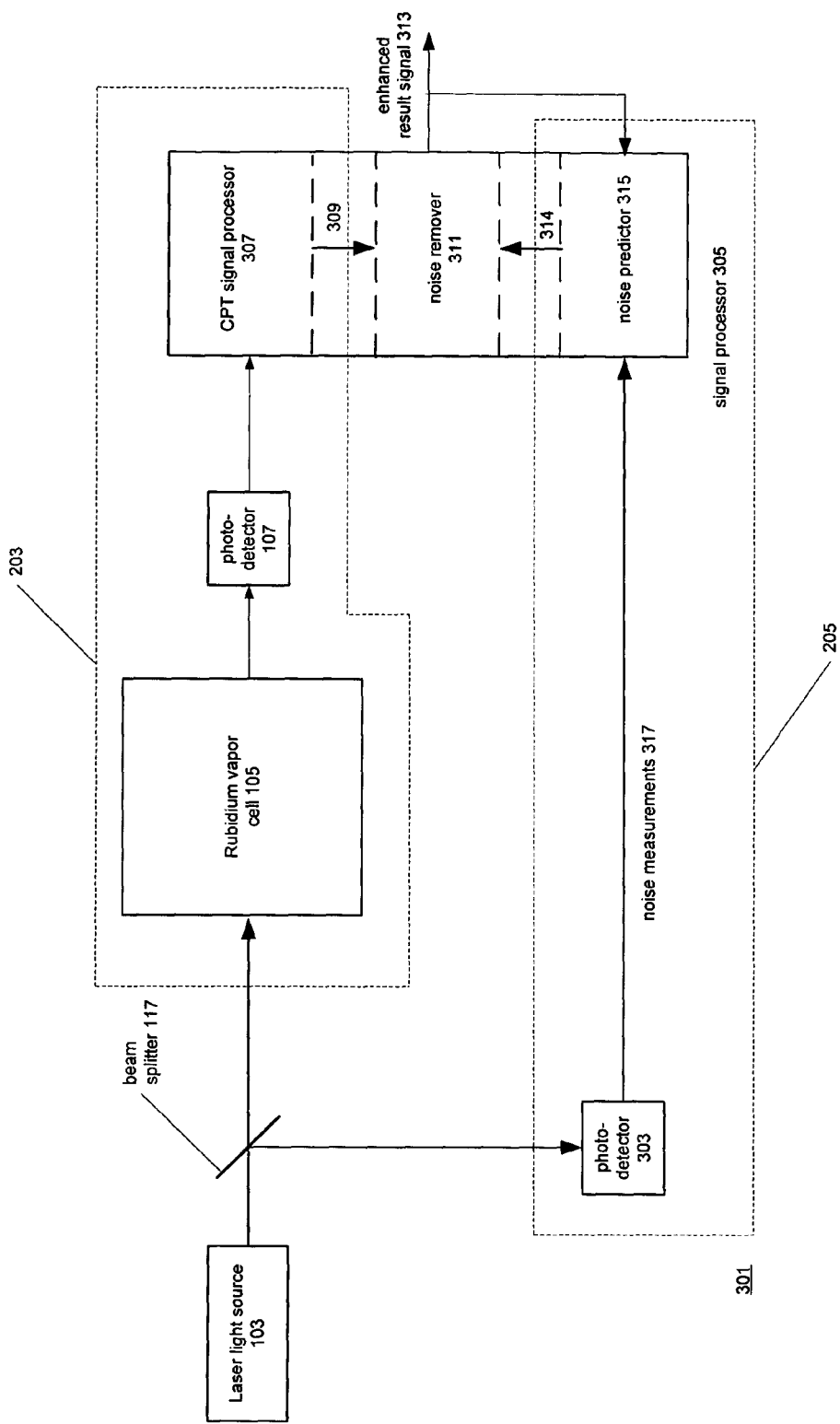
FIG. 3 is a block diagram of a CPT frequency standard which is an embodiment of the apparatus of FIG. 2.

A Noise Signal Processing Channel 205 in a CPT Frequency Standard: FIG. 3

FIG. 3 shows how the technique just described in overview can be applied to reduce the amount of noise in the result signal of a CPT frequency standard like the one shown at 101 in FIG. 1. The components of output signal processing channel 203 are rubidium vapor cell 105, photodetector 107, and a CPT signal processing program 307 executing on signal processor 305, which produces output signal with noise 309. The components of noise signal processing channel 205 are photodetector 303 and noise predictor 317. Noise remover 311 receives output signal 309 and noise signal 314 and produces enhanced result signal 313, which is also fed back to noise predictor 315. Noise remover 311 and noise predictor 315 are also implemented as programs executing in signal processor 305. Of course, there may be more than one noise signal processing channel, noise measurements 317 in a given noise signal processing channel may be produced by more than one photodetector 303, the programs executed by signal processor 305 may execute on more than one signal processor 305, and dedicated hardware may be used instead of signal processor 315 for the noise predictor and/or the noise remover.

Continuing in more detail, before passing through the Rubidium-87 vapor in cell 105, the modulated laser light has essential fixed amplitude (intensity) EXCEPT for a certain amount of unwanted noise that is produced by the laser. This noise causes amplitude fluctuations that will be passed thorough the Rubidium-87 vapor in cell 105 and will be additively combined with the amplitude modulation produced by the resonance effect of the Rubidium-87 vapor. Thus, the desired signal and noise components are combined and it is this combined signal and noise that is detected by primary broadband photodetector 107. The technique described herein removes the noise component from the combined signal and noise. The noise reference measurement 317 that is used for this circuit is provided by a second broadband light detector 303 that measures the laser amplitude before it passes through cell 105. (In some cases, more than one reference detector is used to improve performance). Since there is no rubidium vapor cell 105 in the path between laser light source 103 and photodetector 303, noise measurements 317 will vary only as the amplitude of the laser light varies, i.e., they will track the noise produced by the laser light source.

Noise measurements 317 and the noise component in output signal 309 channel are thus highly correlated but differ in delay, amplitude and filtering effects. Because this is so, the component of the noise in output signal 309 caused by amplitude noise in laser 103 can be perfectly constructed from reference noise measurements 317 by combining scaled and delayed versions of these measurements 317. The result of these combinations is output as noise signal 314. Another way to express this same concept is that it would be possible to recreate the noise component in the primary channel by passing the noise measurements 317 thorough a filter that delays, scales, and combines the versions of measurements 317. Further, if feedback from the enhanced result signal 313 is added to the input from noise measurements 317, noise signal 314 will vary not only according to the noise caused by the amplitude variations in laser light source 103, but also according to the noise caused by frequency variations in light source 103 and shot noise from photodetector 107, as well as from other sources in channel 203, and this noise will be removed along with the noise caused by the amplitude variations. The filter employed in the preferred embodiment is a FIR (Finite Impulse Response) filter whose coefficients are determined using the feedback from enhanced result signal 313. An IIR (Infinite Impulse Response) filter or any other filter which recreates the noise component from the noise measurements may be used instead.

Figure 4:
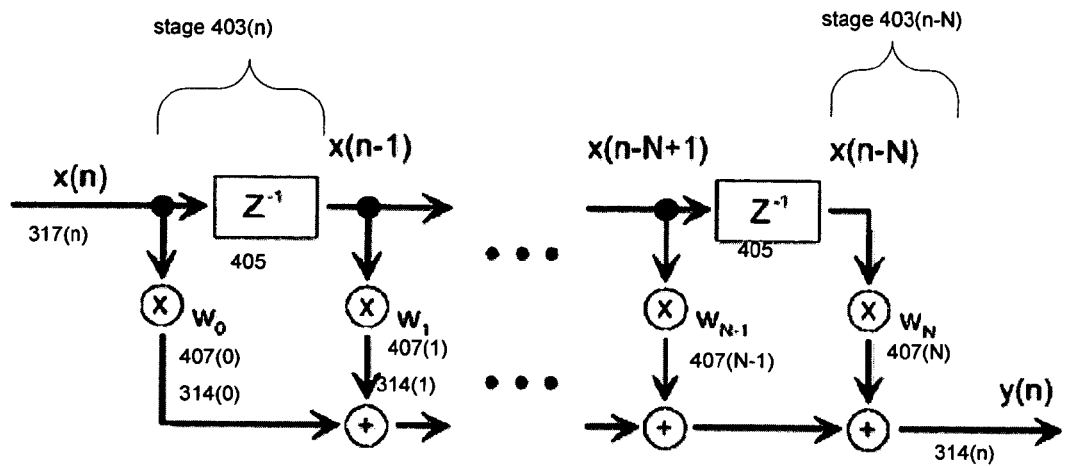
FIG. 4 is a block diagram of a FIR filter that is used to predict noise in a preferred embodiment.
Figure 4:
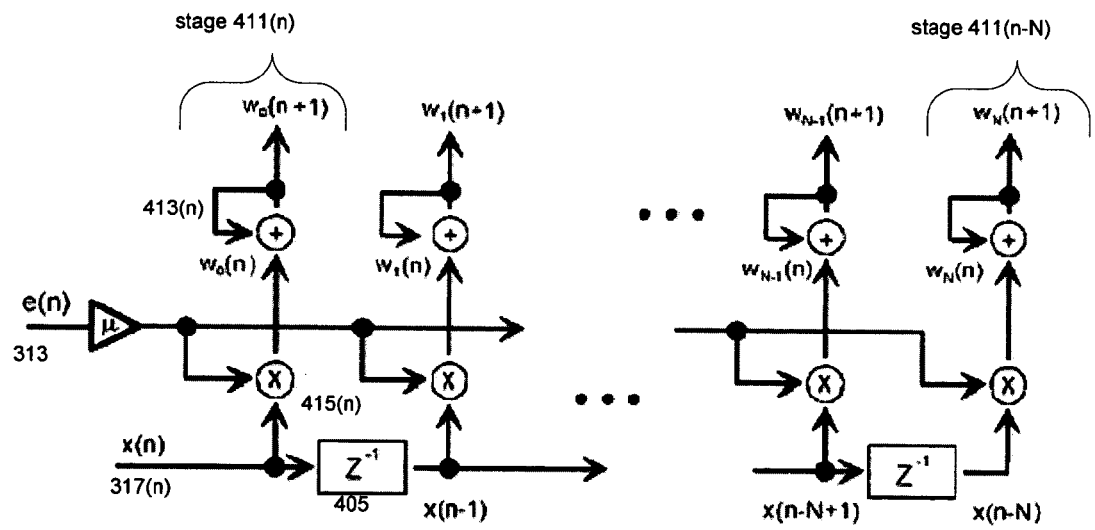

An Implementation of the FIR Filter: FIG. 4

In a preferred embodiment, a discrete version of the FIR filter is implemented in noise measurement processing program 315 in signal processor 315. The input to the program is data sampled from noise measurements 315. In other embodiments, equivalent analog versions may be used to produce a noise prediction y(n). The following equation and block diagram 401 of FIG. 4 describe the algorithm of a discrete FIR filter for discrete samples of the noise reference.

$$y(n) = \sum_{i=0}^{N} w_i \cdot x(n-i)$$

Where
n=Sample time
wi=Filter coefficients (0 to N)
x(n)=Input samples (Noise reference measurements)
y(n)=Output samples (Noise prediction)

As may be seen from block diagram 401, the FIR filter is a pipeline with N stages 403(*n* . . . *n*–N). Each noise measurement 317 passes through all of the stages, being attenuated at each stage, and the output 314(*n*) at any given time is produced from all of the noise measurements currently in the pipeline. In the first stage, the noise measurement is multiplied by a filter coefficient $w_0$ to produce a first component 314(0) of noise signal 314(*n*). The noise measurement 317 is also attenuated by a factor of 10 before being passed to the next stage. The immediately preceding noise measurement 317(*n*–1) is now in stage 403(*n*–1), where a second filter coefficient $w_1$ produces a second component 314(1), which is added to first component 314(0), the next preceding noise measurement is now in stage 403(*n*–2), and so on. Output 314(*n*) is the sum of all of the outputs produced by the stages from the input noise measurements 317(*n* . . . *n*–N) that are currently in the pipeline.

A FIR filter like that shown at 401 can be made adaptive by using enhanced result signal 313 to adjust the coefficients $w_0 \ldots w_N$. There are numerous algorithms employed in the area of signal identification to adjust the filter coefficients and these algorithms can be used to do noise prediction as well. Well documented methods such as the Kalman or RLS (Recursive Least-Square) are viable techniques, depending on the characteristics of the noise in question. In a preferred embodiment, the LMS (or Least-Mean-Square) algorithm is employed. LMS uses the following recursion to adjust the filter coefficients after every sample:

$$w_i(n+1) = \sum_{i=0}^{N} w_i(n) + \mu \cdot e(n) \cdot x(n-i)$$

Where
$w_i(n+1)$=Filter Coefficients applied during NEXT sample time.
$w_i(n)$=Filter Coefficients used during THIS sample time.
e(n)=Error signal (Feedback after noise removal)
$\mu$=Stepsize (adjustable algorithm parameter)

Block diagram 409 shows how the stages 403 of FIR filter 401 are modified to produces stages 411. At each stage i, the current coefficient $w_i(n)$ for the time n is produced at 415 from the input signal 317(*i*) for the stage as modified by enhanced result signal 313, and to that is added the coefficient output $w_i$ from the preceding time n–1 to produce the coefficient output $w_i(n+1)$, which is used to produce the coefficient output $w_i$ in time n+1.

The manner in which noise remover 311 produces enhanced result signal 313 from output signal with noise 309 and noise signal 314 depends on how the noise affects output signal 309. Here, the noise from the laser's amplitude variations is additively combined with the desired signal so noise remover 311 simply subtracts the noise prediction from the output of the primary channel.

CONCLUSION

The foregoing Detailed Description has disclosed to those skilled in the relevant technologies how to make and use a CPT frequency standard that incorporates the laser light processing apparatus of the invention and has further disclosed to those skilled in the relevant technologies the best mode presently known to the inventors of making the invention. As pointed out in the Detailed Description, the techniques of the invention may be applied not only in CPT frequency standards, but in any apparatus that produces an output signal that has a noise component by processing laser light. Details of a particular implementation of a noise channel 205 will depend on the nature of the laser light being processed, on the nature of the manner in which the laser light is processed, and on the nature of the noise component in the output signal. Moreover, within the limitations imposed by the foregoing, the designer of a particular implementation may employ any of the techniques common in the area of signal processing and may take into account any of the usual signal processing design tradeoffs. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A CPT frequency standard comprising:
a laser light source;
a resonating quantum medium through which the laser light passes, the resonating quantum medium resonating in response to the laser light and thereby affecting the amount of laser light that passes through the resonating quantum medium;
a first photodetector that receives the laser light that passes through the resonator and produces a signal in response thereto;
an output processor that responds to the signal from the photodetector to produce an output signal that includes at least noise resulting from amplitude changes in the laser light;
a second photodetector that receives laser light that has not passed through the resonating quantum medium and produces a noise measurement signal therefrom;
a noise predictor that produces a noise signal in response to the noise measurement signal; and
a noise remover that responds to the noise signal and the output signal to produce an enhanced output signal in which the noise has been reduced.

2. The CPT frequency standard set forth in claim 1 wherein:
the noise predictor employs scaled and/or delayed noise measurements to produce the noise signal.

3. The CPT frequency standard set forth in claim 2 wherein:
the scaled and/or delayed noise measurements are employed in a FIR filter.

4. The CPT frequency standard set forth in claim 1 wherein:
the noise predictor further produces the noise signal in response to the enhanced output signal.

5. The CPT frequency standard set forth in claim 4 wherein:

the noise predictor employs scaled and/or delayed noise measurements to produce the noise signal and scales the noise measurements in response to the enhanced output signal.

6. The CPT frequency standard set forth in claim 5 wherein:

the scaled and/or delayed noise measurements are employed in a FIR filter.

* * * * *